US011895037B2

(12) United States Patent
Sugisono et al.

(10) Patent No.: US 11,895,037 B2
(45) Date of Patent: Feb. 6, 2024

(54) PROCESSING DEVICE, RELOCATION METHOD, AND RELOCATION PROGRAM

(71) Applicant: Nippon Telegraph and Telephone Corporation, Tokyo (JP)

(72) Inventors: Koji Sugisono, Musashino (JP); Shinya Kawano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/786,354

(22) PCT Filed: Jan. 9, 2020

(86) PCT No.: PCT/JP2020/000513
§ 371 (c)(1),
(2) Date: Jun. 16, 2022

(87) PCT Pub. No.: WO2021/140630
PCT Pub. Date: Jul. 15, 2021

(65) Prior Publication Data
US 2023/0024732 A1    Jan. 26, 2023

(51) Int. Cl.
*H04L 47/267*    (2022.01)
*H04L 47/2483*    (2022.01)
*H04L 47/762*    (2022.01)

(52) U.S. Cl.
CPC ........ *H04L 47/267* (2022.05); *H04L 47/2483* (2013.01); *H04L 47/762* (2013.01)

(58) Field of Classification Search
CPC .. H04L 47/267; H04L 47/2483; H04L 47/762
See application file for complete search history.

(56) References Cited

U.S. PATENT DOCUMENTS 10,673,716 B1 * 6/2020 Sethuramalingam ........................ G06F 16/9024
10,721,315 B1 * 7/2020 Ezra ........................ H04L 67/02
(Continued)

FOREIGN PATENT DOCUMENTS

CN    106657173 B * 1/2020 ............... G06F 8/65

OTHER PUBLICATIONS

Sugisono et al., "Migration for VNF instances Forming Service Chain," IEEE CloudNet 2018, Oct. 22, 2018, 3 pages.

*Primary Examiner* — Mohamed A. Wasel
*Assistant Examiner* — Jihad K Boustany
(74) *Attorney, Agent, or Firm* — Fish & Richardson P.C.

(57) ABSTRACT

A VNF operation apparatus is a processing apparatus that relocates data processing functions to another apparatus to continue data processing and includes: a storage unit configured to store information indicating a communication relationship between apparatuses; an estimation unit configured to calculate, based on the information indicating the communication relationship, an estimation value of a transfer delay of data generated during relocation for a plurality of schedulings having different orders of relocation of the data processing functions; a scheduling unit configured to select a scheduling for which the estimation value calculated by the estimation unit is minimized, and sets, based on the selected scheduling, an order of relocation of the data processing functions and a start timing of relocation of the data processing functions; and a relocation unit configured to relocate VNFs to the other apparatus in accordance with the order and the timing set by the scheduling unit.

12 Claims, 14 Drawing Sheets

(56) References Cited

U.S. PATENT DOCUMENTS

| | | | |
|---|---|---|---|
| 11,627,034 B1* | 4/2023 | Chawathe | H04L 41/0631 |
| | | | 709/224 |
| 2016/0191326 A1* | 6/2016 | Cao | H04L 41/122 |
| | | | 709/223 |
| 2022/0294858 A1* | 9/2022 | Yu | H04L 63/0281 |
| 2022/0318072 A1* | 10/2022 | Li | H04L 67/10 |

* cited by examiner

UPSTREAM VNF

DOWNSTREAM VNF

PROCESSING DEVICE, RELOCATION METHOD, AND RELOCATION PROGRAM

CROSS-REFERENCE TO RELATED APPLICATIONS

This application is a National Stage application under 35 U.S.C. § 371 of International Application No. PCT/JP2020/000513, having an International Filing Date of Jan. 9, 2020. The disclosure of the prior application is considered part of the disclosure of this application, and is incorporated in its entirety into this application.

TECHNICAL FIELD

The present invention relates to a processing apparatus, a relocation method, and a relocation program.

BACKGROUND ART

There is widely used a stateful network function such as network address port translation (NAPT) or firewall using state information, which is a processing history in the past, for packet processing. Here, these packet processing functions, which were implemented by hardware, are implemented by software and operated in a general-purpose server, so that it becomes possible to deploy the functions in response to a traffic demand. Further, it becomes possible to achieve optimization of a transfer path associated with movement of a terminal of a user, to which data is delivered, by moving (relocating) software implementation to another server.

Among such pieces of software, when a piece of software that executes a stateful packet processing function is relocated, it is required to transfer data to a relocation destination, the data for resuming the software at the relocation destination. The data to be transferred to the relocation destination is a flow state or the like.

This flow state is updated by packet processing. As a result, the flow state transferred to the relocation destination during continuation of the packet processing has data older than that of a flow state of a relocation source because the flow state of the relocation source continues to be updated by the software of the relocation source at the relocation source. Although the software needs to perform the packet processing based on the latest state, if this goes on, it is impossible to run the software correctly at the relocation destination after relocation of the packet processing function, which is a problem.

Accordingly, in the related art, there occurs a need to temporarily stop the software to fully synchronize the flow states of the relocation source and the relocation destination. However, packets having arrived during temporal stop of the software have a deteriorated transfer quality due to dropping or waiting in a queue, which is a problem.

In particular, in a service such as virtual reality (VR) or augmented reality (AR), a transfer time of data on an event, images of a virtual space, and the like needs to be shortened in order to reflect the event generated around a user in the virtual space in real time. However, when a network function is relocated in providing the service such as VR or AR, a phenomenon occurs that leads to an increase in transfer time due to dropping, queuing delay, or the like of data described above.

FIGS. 13 and 14 are diagrams for describing transfer processing of data in the related art. As a data transfer delay reduction method effective when a packet processing function is implemented by software, there is a method in which a plurality of packet processing functions to process an identical data flow are operated at an identical server and a memory bus is used to transfer packets transferred between functions at a high speed (see FIG. 13(1)). When such packet processing functions are moved to another server, data transferred to one of the packet processing functions having an earlier transfer completion timing goes through a network with a great transfer delay as compared to the memory bus (see FIG. 13(2)).

In addition, as illustrated in FIG. 14, when processing is performed in a predetermined order on a traffic, a packet during transfer is subjected to queuing delay each time the packet arrives in the software during relocation. Specifically, as illustrated in FIG. 14, a packet queued with an upstream packet processing function is transferred to a downstream packet processing function after completion of flow state transition of the upstream packet processing function. However, if the flow state has also transitioned in the downstream packet processing function, the packet is also queued in the downstream and thus subjected to queuing delay doubly. Thus, there is a demand to suppress an increase in transfer delay caused by these factors in providing a service requiring low delay communication.

Accordingly, in the related art, there is proposed a method in which a flow transfer stop time at the time of network function relocation is shortened when a plurality of network functions process an identical data flow (for example, see NPL 1).

CITATION LIST

Non Patent Literature

NPL 1: K. Sugisono, et al., "Migration for VNF instances Forming Service Chain", IEEE CloudNet2018, 2018.

SUMMARY OF THE INVENTION

Technical Problem

The method described in NPL 1 is a method for shortening a period of time for which packet loss occurs when a temporal stop time of packet processing functions at the time of relocation depends greatly on an amount of packets to be processed by the packet processing functions, and when packet queuing is not performed in each of the packet processing functions. In the method described in NPL 1, a packet processing function to be relocated and a relocation execution timing thereof are determined by a scheduler.

Accordingly, the method described in NPL 1 is effective when a packet is dropped during relocation and no increase in transfer delay as described above is generated. However, when the passing order of a traffic flow with respect to the packet processing functions is determined, a packet is queued during relocation of the packet processing functions before the packet is transferred to the destination, and thus the method described in NPL 1 cannot be applied and the transfer delay generated in the interim cannot be reduced.

As a result, the method described in NPL 1 has a problem in that it is impossible to avoid an increase in delay caused by packet queuing delay or packets passing through a network.

The present invention has been made in view of the aforementioned circumstances, and an object thereof is to provide a processing apparatus, a relocation method, and a relocation program that can reduce a transfer delay generated during relocation of data processing functions.

Means for Solving the Problem

In order to solve the problems described above and achieve the object, a processing apparatus according to the present invention is a processing apparatus that relocates data processing functions to another apparatus to continue data processing, the processing apparatus including: a storage unit configured to store information indicating the communication relationship between the apparatuses; a calculation unit configured to calculate, based on the information indicating the communication relationship, an estimation value of a transfer delay of data generated during relocation for a plurality of schedulings having different orders of relocation of the data processing functions; a setting unit configured to select a scheduling for which the estimation value calculated by the calculation unit is minimized and set, based on the selected scheduling, an order of relocation of the data processing functions and a start timing of relocation of the data processing functions; and a relocation unit configured to relocate the data processing functions to the other apparatus in accordance with the order and the timing set by the setting unit.

In addition, a relocation method according to the present invention is a processing apparatus that relocates data processing functions to another apparatus to continue data processing, the method including; calculating, based on information indicating a communication relationship between apparatuses, an estimation value of a transfer delay of data generated during relocation for a plurality of schedulings having different orders of relocation of the data processing functions; selecting a scheduling for which the calculated estimation value is minimized and setting, based on the selected scheduling, an order of relocation of the data processing functions and a start timing of relocation of the data processing functions; and relocating the data processing functions to the other apparatus in accordance with the set order and timing.

In addition, a relocation program according to the present invention causes a computer to: calculate, based on information indicating a communication relationship between apparatuses, an estimation value of a transfer delay of data generated during relocation for a plurality of schedulings having different orders of relocation of the data processing functions; select a scheduling for which the calculated estimation value is minimized and set, based on the selected scheduling, an order of relocation of the data processing functions and a start timing of relocation of the data processing functions; and relocate the data processing functions to another apparatus in accordance with the set order and timing.

Effects of the Invention

According to the present invention, it is possible to reduce a transfer delay generated during relocation of data processing functions.

DESCRIPTION OF EMBODIMENTS

Hereinafter, an embodiment of a processing apparatus, a relocation method, and a relocation program according to the present application will be described in detail based on the drawings. The present invention is not limited by the embodiment described below.

Embodiment

First, the embodiment will be described. The present embodiment relates to a relocation method for relocating virtual network functions (VNFs) that implement software activated in different servers to another apparatus to continue the VNFs. The VNFs each are software that performs packet processing, such as network address port translation (NAPT), firewall, an intrusion detection system (IDS), or a router, and are capable of running on any server in which there is an operating environment. The VNFs each serve as a data processing function.

The present embodiment relates to a relocation method when for maintenance or load balancing of a server, it is desired to run VNFs on another server. Furthermore, in the present embodiment, a relocation method of VNFs to another server when a passing order of a traffic flow with respect to the VNFs is determined will be described. Note that the present embodiment is not limited to the relocation of the VNFs when the passing order of the traffic flow with respect to the VNFs is determined, and can be also applied to a transition method when a virtual machine having a data processing function for processing data such as an application layer transitions to another server apparatus.

Configuration of Communication System

Figure 1:
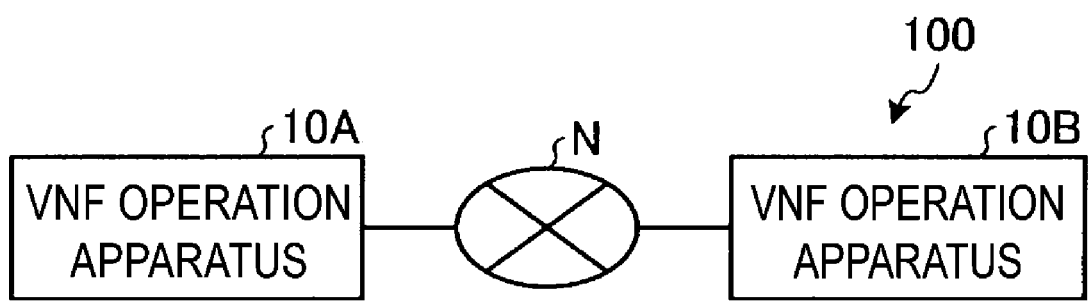
FIG. 1 is a block diagram illustrating an example of a configuration of a communication system according to an embodiment.

FIG. 1 is a block diagram illustrating an example of a configuration of a communication system according to the embodiment. As illustrated in FIG. 1, a communication system 100 according to the embodiment includes a VNF operation apparatus 10A and a VNF operation apparatus 10B. The VNF operation apparatuses 10A, 10B communicate with each other via a network N. Note that a high-order controller (not illustrated) is provided in an upper level of the VNF operation apparatuses 10A, 10B, and when relocation of VNFs is performed, the controller sets a VNF operation apparatus which is the relocation destination. The number of the VNF operation apparatuses 10A, 10B is an example, and the number of VNF operation apparatuses is not limited to the number in FIG. 1.

The VNF operation apparatuses 10A, 10B are physical apparatuses that operate VNFs, and are specifically server apparatuses. In the present embodiment, the VNF operation apparatus 10A is described as an apparatus that is the relocation source of VNFs. In addition, in the present embodiment, the VNF operation apparatus 10B is described as an apparatus that is the relocation destination of VNFs. The VNF operation apparatus 10A is a processing apparatus that relocates VNFs, which are run on the VNF operation apparatus 10A, to the VNF operation apparatus 10B to continue packet processing.

The VNF operation apparatus 10A transfers a state to the VNF operation apparatus 10B that is the relocation destination, as data for resuming the VNFs in the VNF operation apparatus 10B that is the relocation destination. The state corresponds to, for example, a flow assignment address of NAPT and behavior information of a flow of an IDS. The VNF operation apparatus 10A relates to a method for relocating VNFs to the VNF operation apparatus 10B in a case in which a passing order of a traffic flow with respect to the VNFs is determined, and reduces the transfer delay generated during relocation of the VNFs.

Configuration of VNF Operation Apparatus

Figure 2:
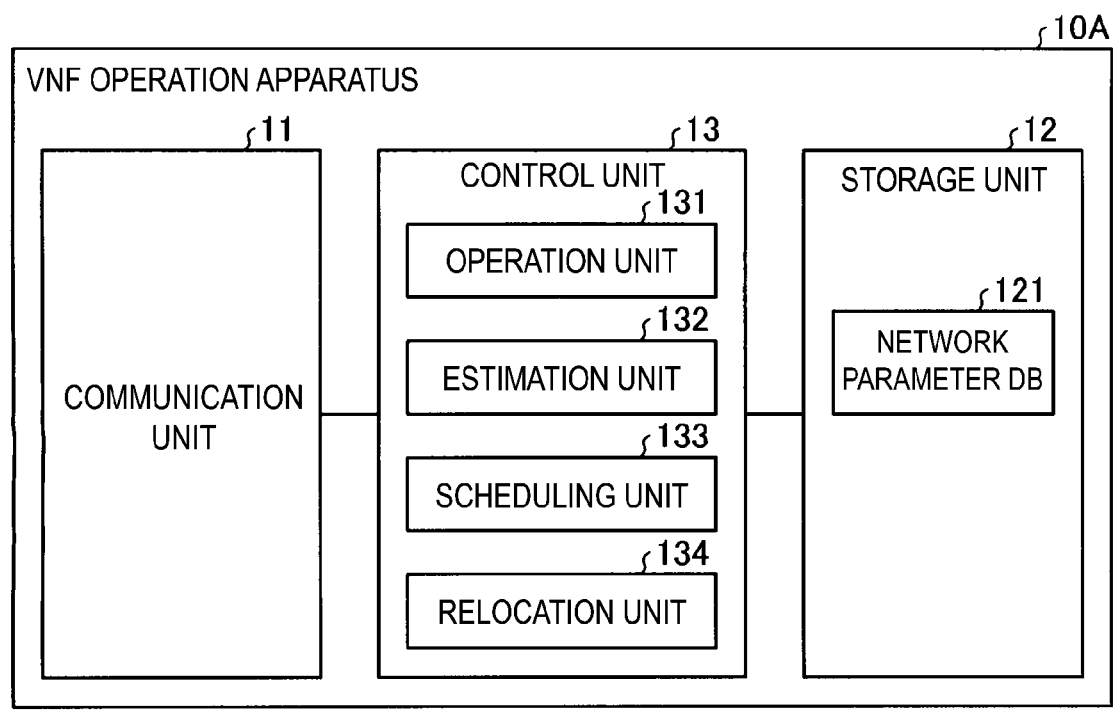
FIG. 2 is a block diagram illustrating an example of a configuration of a VNF operation apparatus illustrated in FIG. 1.

Next, a configuration of the VNF operation apparatus 10A will be described. FIG. 2 is a block diagram illustrating an example of a configuration of the VNF operation apparatus 10A illustrated in FIG. 1. As illustrated in FIG. 2, the VNF operation apparatus 10A has a communication unit 11, a storage unit 12, and a control unit 13.

The communication unit 11 is a communication interface that transmits and/or receives various types of information to and/or from another apparatus connected via a network or the like. The communication unit 11 performs communication between another apparatus (for example, the VNF operation apparatus 10B) and the control unit 13 (which will be described below) via an electrical communication line such as a local area network (LAN) or the Internet.

The storage unit 12 is realized by a semiconductor memory element such as a random access memory (RAM) or a flash memory and a processing program for causing the VNF operation apparatus 10A to operate, data used during execution of the processing program, and the like are stored in the storage unit 12. The storage unit 12 includes a network parameter database (DB) 121.

The network parameter DB 121 is a DB that manages programs and statistical information and measurement information of events generated within the network. The network parameter DB 121 stores information indicating a communication relationship between servers. The network parameter DB 121 store order information indicating a passing order of the VNFs through which the traffic flow passes as the information indicating a communication relationship between servers.

The control unit 13 controls the entire VNF operation apparatus 10A. The control unit 13 is, for example, an electronic circuit such as a central processing unit (CPU), or an integrated circuit such as an application specific integrated circuit (ASIC) or a field programmable gate array (FPGA). In addition, the control unit 13 includes an internal memory for storing programs defining various processing procedures and control data, and executes each of the processing operations using the internal memory. Further, the control unit 13 functions as various processing units by operating various programs. The control unit 13 includes an operation unit 131, an estimation unit 132 (calculation unit), a scheduling unit 133 (setting unit), and a relocation unit 134.

The operation unit 131 implements packet processing functions by software-implementing the VNFs and running the VNFs.

The estimation unit 132 calculates an estimation value of the transfer delay generated during relocation of the VNFs. Here, a plurality of schedulings having different orders of relocation of the VNFs are set as the scheduling of the VNF. The schedulings each are set using a scheduling algorithm.

The estimation unit 132 calculates, based on the order information indicating the passing order of the VNFs, an estimation value of the transfer delay of the packets generated during relocation, for each of the plurality of schedulings having different orders of relocation of the VNFs. The estimation unit 132 calculates an estimation value of the transfer delay of packets that occurs during relocation, based on the packet transfer delay between VNFs and a relocation time of the VNFs. Note that the relocation time of the VNFs is used in calculating a queuing delay.

The scheduling unit 133 selects a scheduling for which the estimation value is minimized, among estimation values of the transfer delay of the packets generated during relocation calculated by the estimation unit 132. The scheduling unit 133 sets an order of relocation of the VNFs and a start timing of relocation of the VNFs, based on the selected scheduling.

The relocation unit 134 relocates the VNFs to the VNF operation apparatus 10B in accordance with the order and timing set by the scheduling unit 133.

Note that the VNF operation apparatus 10B may have the same configuration as the VNF operation apparatus 10A. The VNF operation apparatus 10B only needs to have at least a function capable of running the VNFs as the relocation destination of the VNFs.

Example of Scheduling Algorithm

Figure 3:
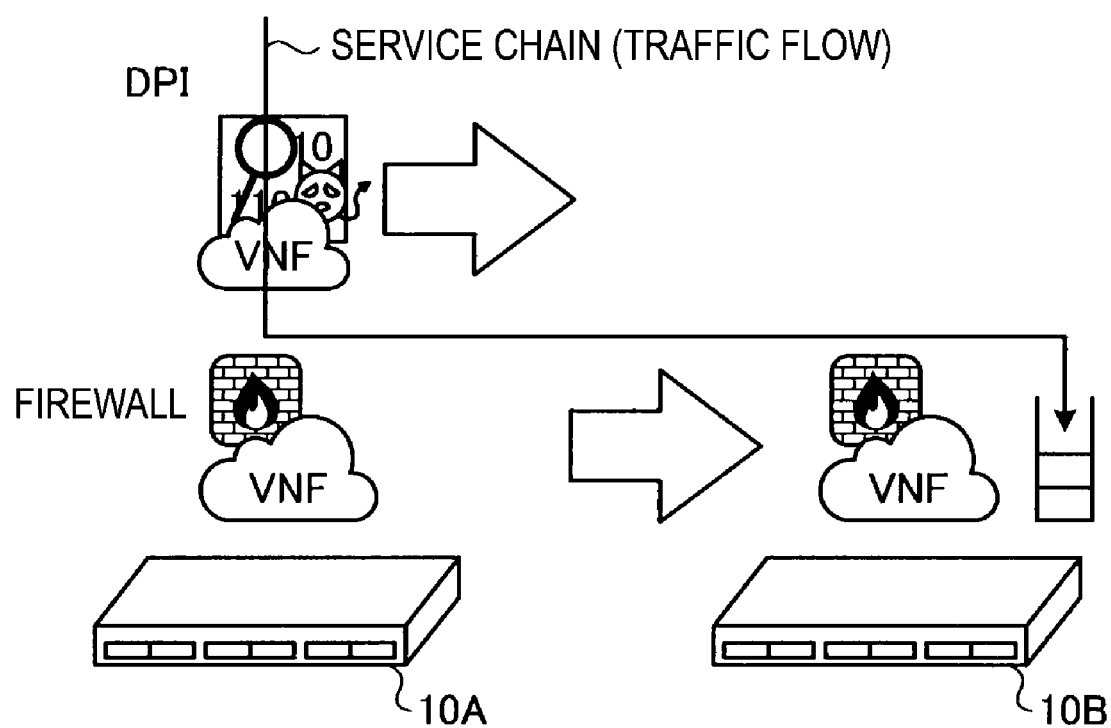
FIG. 3 is a diagram for describing an example of a scheduling algorithm.
Figure 4:
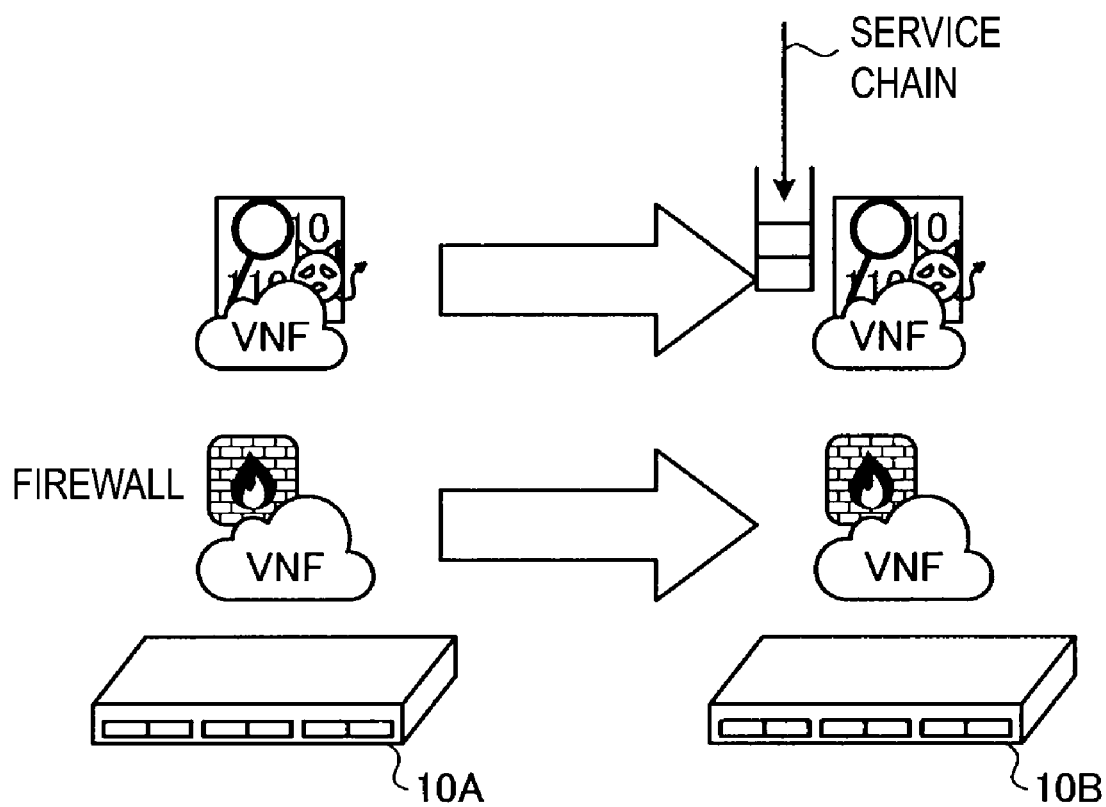
FIG. 4 is a diagram for describing an example of the scheduling algorithm.

Next, an example of a scheduling algorithm will be described. FIGS. 3 and 4 each are a diagram for describing an example of the scheduling algorithm.

First, a downstream priority method, which is an example of the scheduling algorithm, will be described with reference to FIG. 3. The downstream priority method is a method of starting relocation from a VNF close to a receiver side. The downstream priority method is a method in which VNFs are sequentially relocated prioritizing the side closer to the receiver side, that is, the downstream side. In other words, in the downstream priority method, as illustrated in FIG. 3, once relocation of a VNF on the most-downstream side is completed, relocation of a VNF on the upstream side closest to the VNF, the relocation of which is completed, is started. As described above, the downstream priority method is a method for relocating VNFs in an order in which the downstream side is prioritized.

Then, a parallel method, which is an example of the scheduling algorithm, will be described with reference to FIG. 4. As illustrated in FIG. 4, the parallel method is a method in which all VNFs are relocated simultaneously in parallel.

Method of Calculating Estimation Value of Transfer Delay

Figure 5:
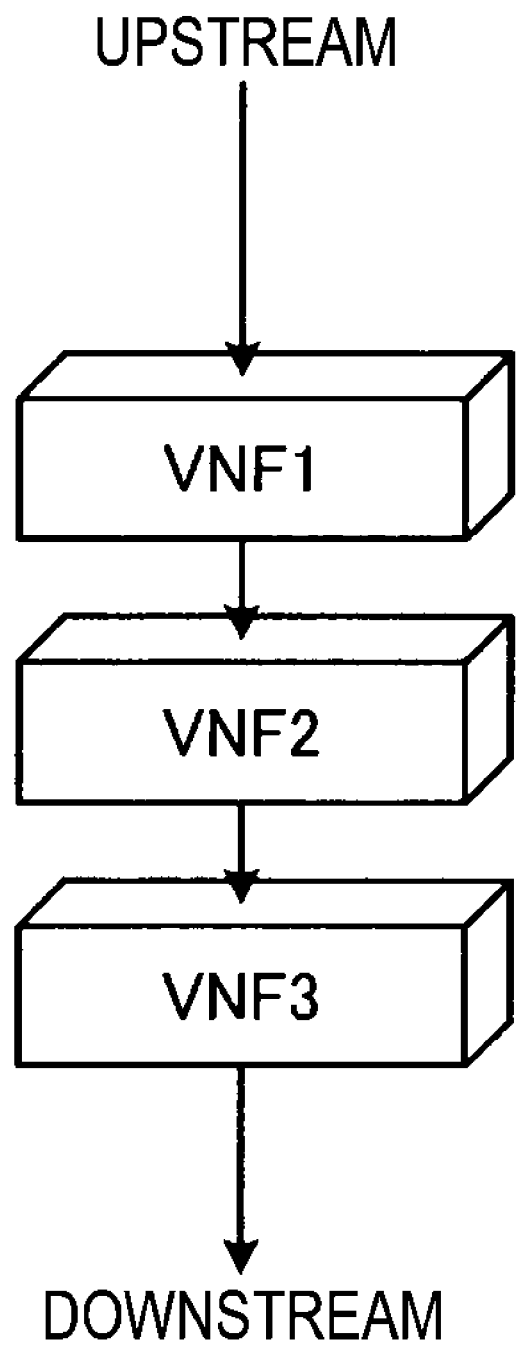
FIG. 5 is a diagram illustrating an example of a passing order of a traffic flow with respect to VNFs.

Next, a method of calculating an estimation value of transfer delay executed by the estimation unit 132 will be described for each of the scheduling algorithms. First, a method of calculating an estimation value of a transfer delay in the downstream priority method will be described. FIG. 5 is a diagram illustrating an example of a passing order of a traffic flow with respect to VNFs. The downstream priority method is a method in which relocation is started prioritizing a VNF 3 on the downstream side over a VNF 1 and a VNF 2 on the upstream side.

In order to calculate an estimation value of a transfer delay in the downstream priority method, an estimation formula f is set based on an average of arrival intervals of packets flowing through a service chain. The estimation formula f is a function for calculation of an average value of additional delays during relocation of the VNFs, and is a function obtained by adding an average value of packet queuing delays and a transfer delay via the network. The average value of packet queuing delays is represented by Equation (1). The transfer delay via the network is represented by Equation (2).

[Math. 1]

$$\text{Average value of packet queuing delays} = \frac{\sum T_i^2}{2T_{all}} - \frac{E[I]}{2} \quad (1)$$

[Math. 2]

$$\text{Transfer delay via network} = \frac{T_{all} - T_1}{T_{all}} \times D \quad (2)$$

Here, $T_i$ is a state transfer time of a VNFi. i is an index number of a VNF. E[I] is an average of arrival intervals of packets. D is a transfer delay when a packet is transferred via the network across servers. Moreover, $T_{all}$ in Equations (1) and (2) is the total state transfer time of VNFs and is represented by Equation (3).

[Math. 3]

$$\text{Sum of state transfer times of all VNFs} = T_{all} = \Sigma T_i$$

As indicated in Equations (1) and (2), the estimation formula f in the downstream priority method uses $T_i$ and E[I] as arguments. For the downstream priority method, the estimation unit 132 uses this estimation formula f to calculate an average value of additional delays during relocation of the transfer delays to be performed.

Next, a method of calculating an estimation value of a transfer delay in the parallel method will be described. In the case of calculating an estimation value of a transfer delay in the parallel method, an estimation formula g is set, which is a function for calculating an average value of additional delays during relocation of the VNFs.

The estimation formula g uses $T_i$ and E[I] as arguments. The estimation formula g is a function that indicates an average value of packet queuing delays. In the parallel method, the average value of packet queuing delays is represented by Equation (4).

[Math. 4]

$$\text{Average value of packet queuing delays} = \frac{T_{par}}{2} - E[I]/2 \quad (4)$$

$T_{par}$ in Equation (4) is represented by Equation (5).

[Math. 5]

$$T_{par} = \sum_{j=1}^{n}(n-j+1)\frac{S'_{j-1,j}}{BW \cdot \alpha(n-j+1)} \quad (5)$$

BW is a state transfer band. $S_j$ is the jth shortest state size. $S'_{j-1,j}$ is a difference between the jth shortest state size and the (j−1)th shortest state size, and is represented by Equation (6). Note that it is assumed that $S'_{0,1}=S_1$ holds.

[Math. 6]

$$S'_{j-1,j}=S_j-S_{j-1}$$

$\alpha(x)$ is a throughput correction value when state transfer of x VNFs is performed in parallel, and is represented by Equation (7).

[Math. 7]

$$\alpha(x) = \left(1 - \frac{1}{1+3x}\right) \quad (7)$$

Figure 6:
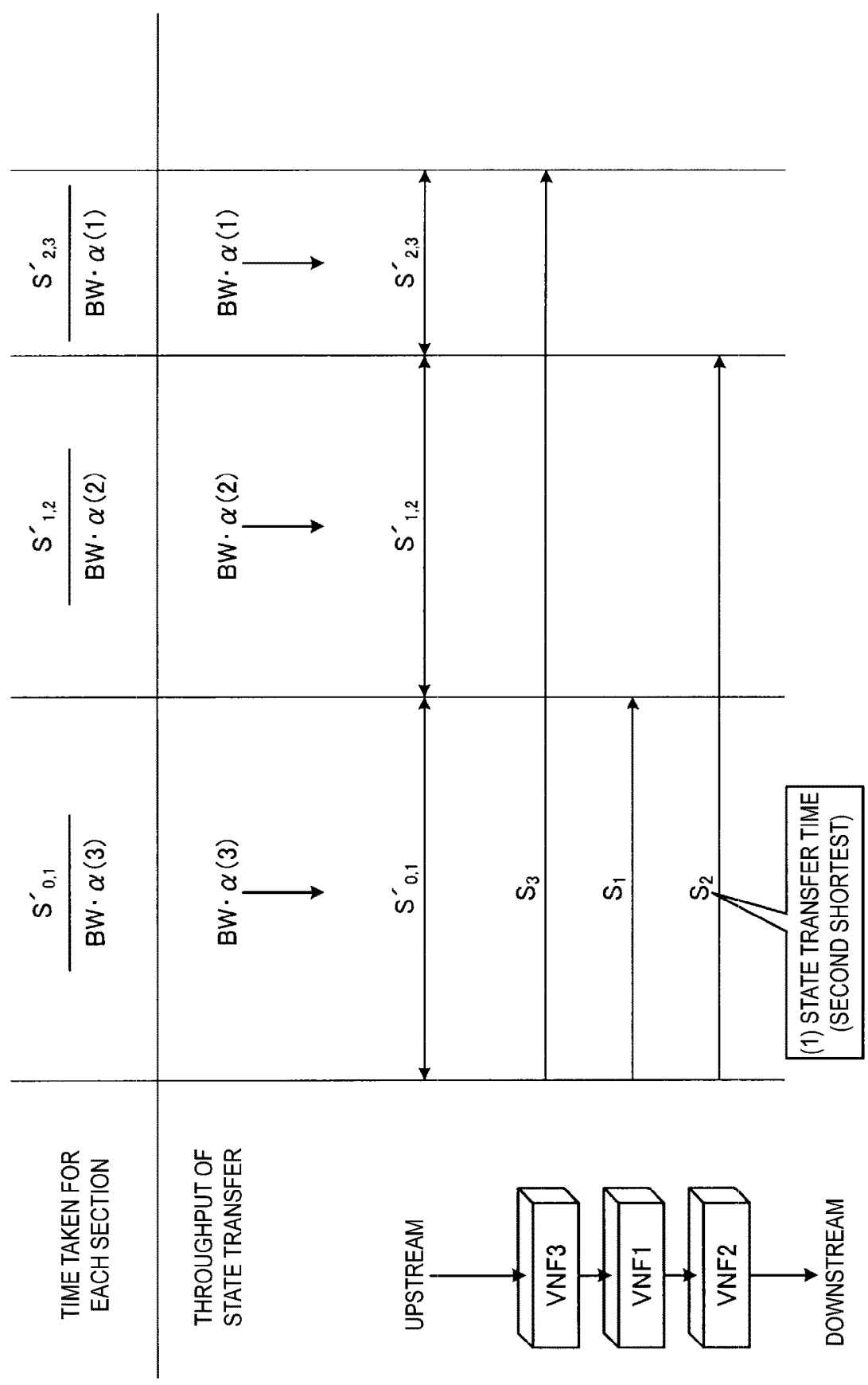
FIG. 6 is a diagram for describing parameters used in calculating an estimation value of a transfer delay in a parallel method.

Here, with reference to FIG. 6, parameters of Equations (5) and (6) will be described. FIG. 6 is a diagram for describing parameters used in calculating an estimation value of a transfer delay in the parallel method.

In FIG. 6, throughputs of the state transfer in sections are corrected by multiplying a state transfer band BW by corresponding $\alpha(1)$, $\alpha(2)$, or $\alpha(3)$, respectively. Then, when the state sizes $S_1$, $S_2$, $S_3$ are larger in the order of the VNF 1, the VNF 2, and the VNF 3, and differences of state sizes in sections (a section to the VNF 1, a section between the VNF 1 and the VNF 2, a section between the VNF 2 and the VNF 3) are $S'_{0,1}$, $S'_{1,2}$, $S'_{2,3}$ as in FIG. 6, a period of time taken for each section is a value obtained by dividing a state size of each section by BW after correction. A period of time taken for the section to the VNF 1 is $S'_{0,1}/(BW \cdot \alpha(1))$, a period of time taken in the section between the VNF 1 and the VNF 2 is $S'_{1,2}/(BW \cdot \alpha(2))$, and a period of time taken in the section between the VNF 2 and the VNF 3 is $S'_{2,3}/(BW \cdot \alpha(3))$, so that it is obtained that the state transfer time for the state having the state size $S_2$ for the VNF 2 is the second shortest (see FIG. 6(1)).

Selection of Scheduling

Next, a method for selecting scheduling will be described. The estimation unit 132 calculates an average value of additional delays during relocation of the VNFs, corresponding to each of the scheduling algorithms. For example, the estimation unit 132 calculates an average value of additional delays during relocation of the VNFs in the downstream priority method, using the estimation formula f in the downstream priority method. Then, the estimation unit 132 calculates an average value of additional delays during relocation of the VNFs in the parallel method using the estimation formula g in the parallel method.

The scheduling unit 133 selects a scheduling for which the average value of additional delays during relocation of the VNFs is minimized, based on the calculation results in the methods calculated by the estimation unit 132.

Figure 7:
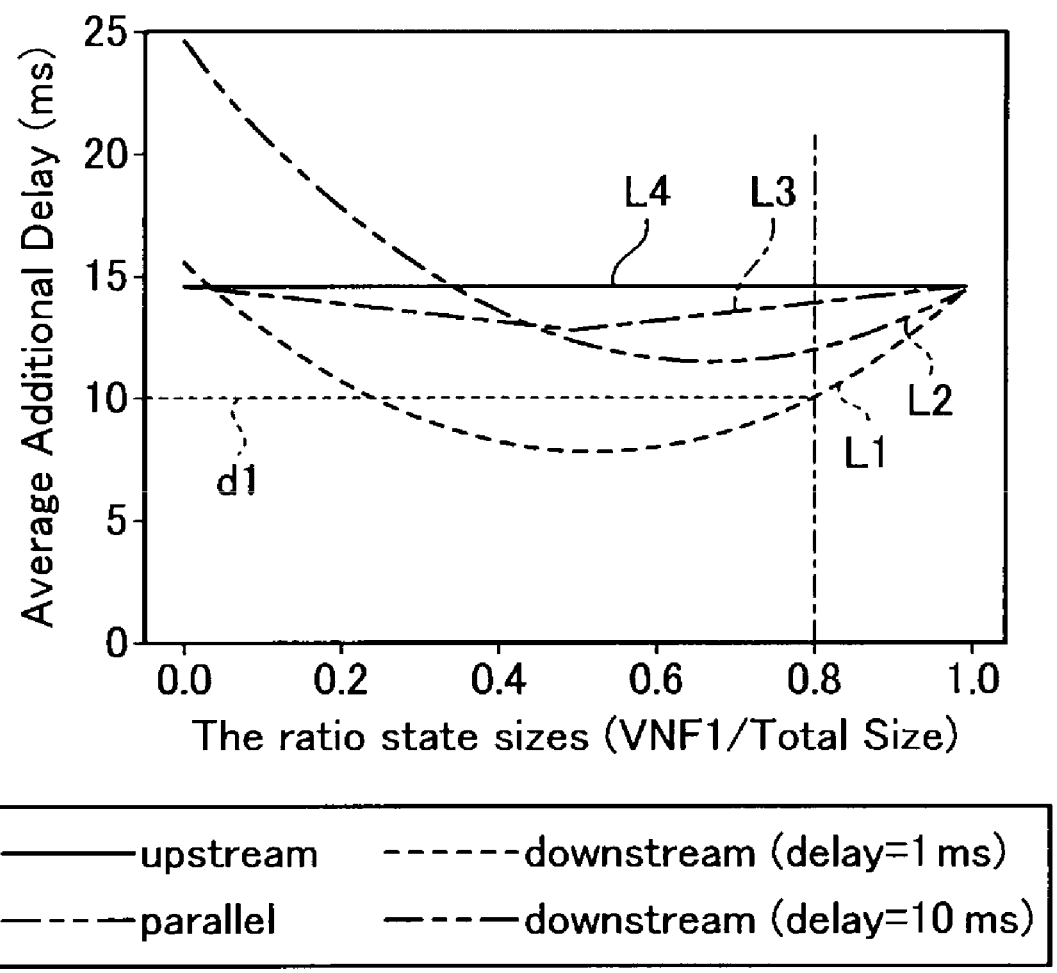
FIG. 7 is a diagram illustrating an average value of additional delay during relocation of VNFs calculated for each scheduling.

FIG. 7 is a diagram illustrating average values of additional delays during relocation of the VNFs calculated for the respective schedulings. In FIG. 7, the vertical axis indicates an average value of additional delays during relocation of the VNFs. In FIG. 7, the horizontal axis indicates a proportion of the state size of the upstream side VNF to the sum of the state sizes of the downstream side VNF and the upstream side VNF. Curves L1, L2 each indicate an average value of additional delays during relocation of the VNFs calculated by the downstream priority method. A curve L3 indicates an average value of additional delays during relocation of the VNFs calculated by the parallel method. A curve L4 indicates an average value of additional delays during relocation of the VNFs calculated by an upstream priority method in which the VNFs are relocated in an order of giving priority to the upstream side.

A description will be given using, as an example, a case in which the ratio of the state sizes of the upstream side VNF and the downstream side VNF is 4:1. In this case, the proportion of the state size of the upstream side VNF to the sum of the state sizes of the downstream side VNF and the upstream side VNF is 0.8. As shown in FIG. 7, the average value of additional delays during relocation of the VNFs corresponding to the value of 0.8 on the horizontal axis takes a minimum of d1 in the downstream priority method indicated by the curve L1.

Thus, in a case in which the ratio of the state sizes of the upstream side VNF and the downstream side VNF is 4:1, the scheduling unit 133 selects the downstream priority method. Note that when conditions change during relocation, in accordance with the change of conditions, the scheduling unit 133 may cause the estimation unit 132 to calculate, for each scheduling, the average value of additional delays during relocation of the VNFs to perform change to a scheduling for which the average value of additional delays is minimized.

Relocation Processing of VNFs

Figure 8:
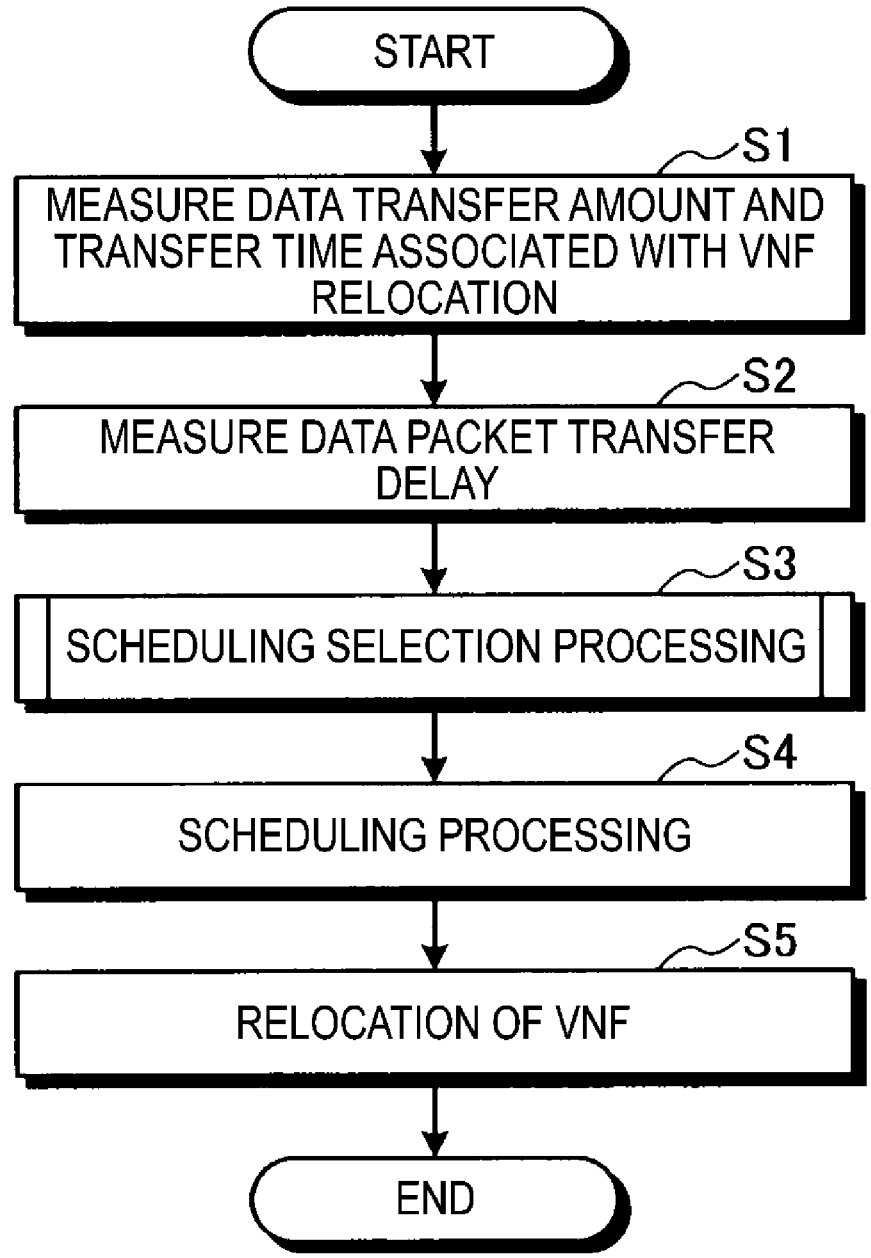
FIG. 8 is a flowchart illustrating a processing procedure of relocation processing of VNFs according to the embodiment.

Next, a processing procedure of relocation processing of VNFs performed by the VNF operation apparatus 10A will be described. FIG. 8 is a flowchart illustrating the processing procedure of relocation processing of the VNFs according to the embodiment.

When the VNFs are relocated, the VNF operation apparatus 10A transfers data necessary to perform processing of the VNFs to the VNF operation apparatus 10B which is the relocation destination. First, as illustrated in FIG. 8, in the VNF operation apparatus 10A, the relocation unit 134 measures a data transfer amount (state size) and a transfer time associated with the relocation of the VNFs in the VNF operation apparatus 10B which is the relocation destination (step S1). For example, there is a method in which based on measured values of a transfer data amount and a throughput of a data transfer line, the measured value of the throughput of the data transfer line is divided by the measured value of the transfer data amount to estimate the transfer delay.

Then, the estimation unit 132 measures a data packet transfer delay between the own apparatus, which is the relocation source server in which the VNFs to be relocated has been run, and the VNF operation apparatus 10B, which is the relocation destination server (step S2).

Subsequently, in the VNF operation apparatus 10A, scheduling selection processing is performed after the data transfer time and the packet transfer delay are acquired (step S3). In step S3, the estimation unit 132 calculates, for each of a plurality of schedulings, an estimation value of the transfer delay of packets generated during relocation of the VNFs. Then, in step S3, the scheduling unit 133 selects a scheduling for which the estimation value is minimized, among the estimation values of the transfer delay calculated by the estimation unit 132.

In the VNF operation apparatus 10A, the scheduling unit 133 performs scheduling processing in which an order of relocation of the VNFs and a start timing of relocation of the VNFs are set based on the selected scheduling (step S4). The relocation unit 134 relocates the VNFs to the VNF operation apparatus 10B in accordance with the order and the timing set by the scheduling unit 133 (step S5).

Scheduling Selection Processing

Figure 9:
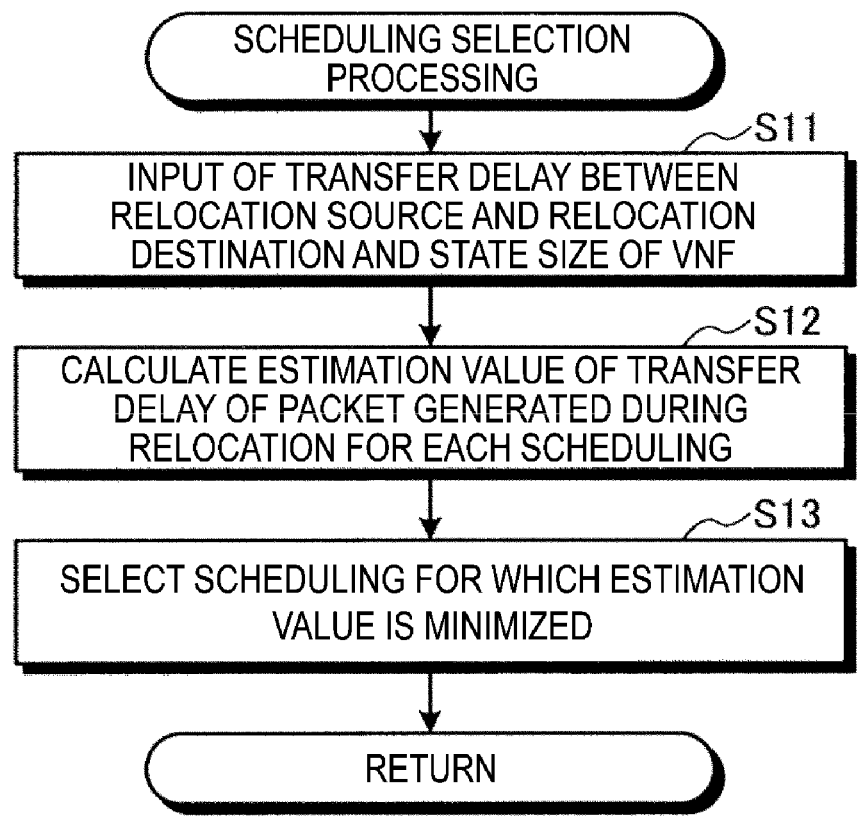
FIG. 9 is a flowchart illustrating a processing procedure of scheduling selection processing illustrated in FIG. 8.

Next, a processing procedure of the scheduling selection processing (step S3) illustrated in FIG. 8 will be described. FIG. 9 is a flowchart illustrating the processing procedure of the scheduling selection processing illustrated in FIG. 8.

As illustrated in FIG. 9, the estimation unit 132 receives inputs of the transfer delay between the VNF operation apparatus 10A which is the relocation source and the VNF operation apparatus 10B which is the relocation destination, and the state sizes of the VNFs (step S11). Then, for each scheduling, the estimation unit 132 calculates an estimation value of the transfer delay of packets generated during relocation (step S12). At this time, in the case of the downstream priority method, the estimation unit 132 obtains the estimation formula f using Equations (1) to (3) and calculates the estimation value of the transfer delay of packets generated during relocation. Meanwhile, in the case of the parallel method, the estimation unit 132 obtains the estimation formula g using Equations (4) to (7) and calculates the estimation value of the transfer delay of packets generated during relocation.

Then, the scheduling unit 133 selects a scheduling of relocation for which the calculated estimation value of the transfer delay is minimized (step S13) to terminate the scheduling selection processing.

Effects of Embodiment

Figure 10:
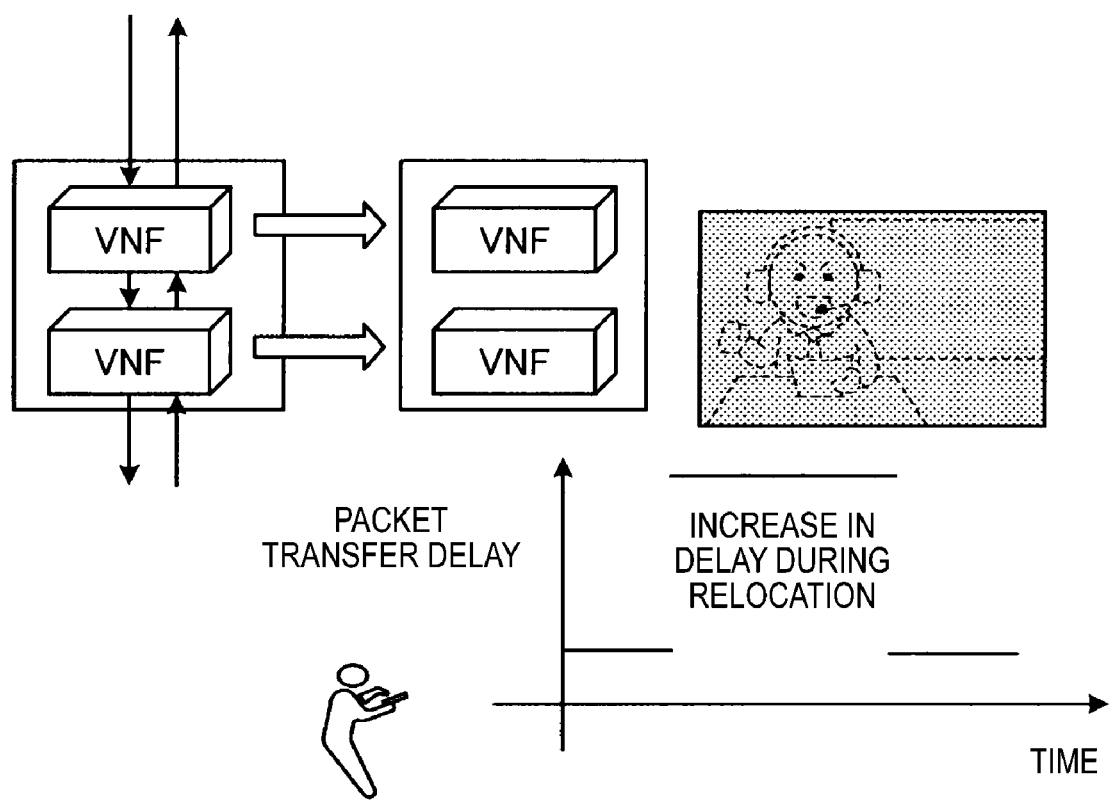
FIG. 10 is a diagram for describing relocation of VNFs in the related art.
Figure 11:
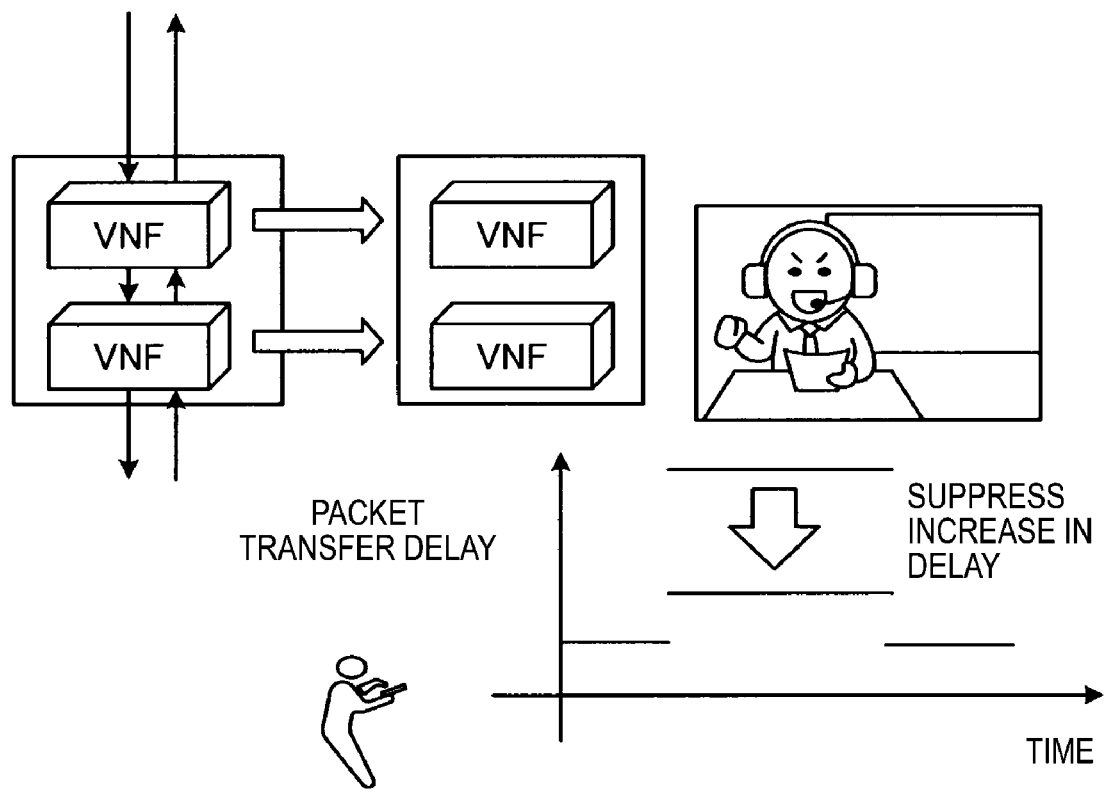
FIG. 11 is a diagram for describing relocation of VNFs according to the embodiment.

FIG. 10 is a diagram for describing the relocation of VNFs in the related art. FIG. 11 is a diagram for describing the relocation of VNFs in the embodiment.

In the method in the related art, when a passing order of a traffic flow with respect to packet processing functions is determined, during relocation of VNFs, a packet queuing delay or an increase in delay by packets passing through the network cannot be avoided, so that as illustrated in FIG. 10, a delay in packet transfer occurs during relocation of the VNFs. Thus, in the method in the related art, for a user of VR or AR that has moved over a long distance, the action of the user cannot be smoothly reflected in the virtual space.

In contrast, in the VNF operation apparatus 10A according to the present embodiment, an estimation value of the transfer delay of packets generated during relocation is calculated for each of a plurality of schedulings having different orders of relocation of the VNFs, based on the order information indicating the passing order of the VNFs through which the traffic flow passes. Then, the VNF operation apparatus 10A sets the order of relocation of the VNFs and the start timing of relocation of the VNFs based on a scheduling for which the calculated estimation value of the transfer delay is minimized, and relocates the VNFs in the VNF operation apparatus 10B in accordance with the set order and timing.

In this way, the VNF operation apparatus 10A can improve a transfer delay when packets are transferred between servers and a queuing delay generated when packets arrive in the VNFs during relocation by changing a scheduling for the relocation of the VNFs. Accordingly, as illustrated in FIG. 11, the VNF operation apparatus 10A can suppress a delay incurred by packets during relocation of the VNFs more than in the method in the related art, so that a sensory quality of a service that requires low delay communications can be maintained.

As a result, the VNF operation apparatus 10A can suppress the transfer delay during relocation of VNFs on a server or a path for load balancing and maintenance of the server more than in the related art. Accordingly, the VNF operation apparatus 10A does not lose the sensory quality even in providing AR or VR in which data from a processing server is transmitted to a terminal with a short delay in order that an event in a virtual space is experienced in a natural manner.

Thus, according to the VNF operation apparatus 10A, it is possible to reduce the transfer delay generated during relocation of packet processing functions in a case where the passing order of the traffic flow with respect to the packet processing functions is determined.

The present embodiment is not limited to the relocation of VNF in which the passing order of the traffic flow with respect to the VNFs is determined, and can also be applied to a transition method when a virtual machine having a data processing function for processing data such as an application layer transitions to another server apparatus, so that it is possible to reduce the transfer delay generated during relocation of the data processing functions.

System Configuration in Embodiment

Each component of the VNF operation apparatuses 10A, 10B illustrated in FIG. 1 is a functional concept and need not necessarily be physically configured as in the drawing. That is, the specific form of distribution and integration of the functions of the VNF operation apparatuses 10A, 10B is not limited to the illustrated form, and the entirety or a portion of the form can be configured by being functionally or physically distributed and integrated in any unit, depending on various loads, usage conditions, and the like.

All or some types of processing performed by the VNF operation apparatuses 10A, 10B may be implemented by a CPU and a program that is analyzed and executed by the CPU. The processing performed by the VNF operation apparatuses 10A, 10B may be implemented as hardware based on a wired logic.

Further, all or some of the processing operations described as being automatically performed among the processing operations described in the embodiment may be manually performed. Alternatively, all or some of the processing operations described as being manually performed can be automatically performed using a known method. In addition, the processing procedures, control procedures, specific names, and information including various types of data and parameters described and illustrated above can be appropriately changed unless otherwise specified.

Program

Figure 12:
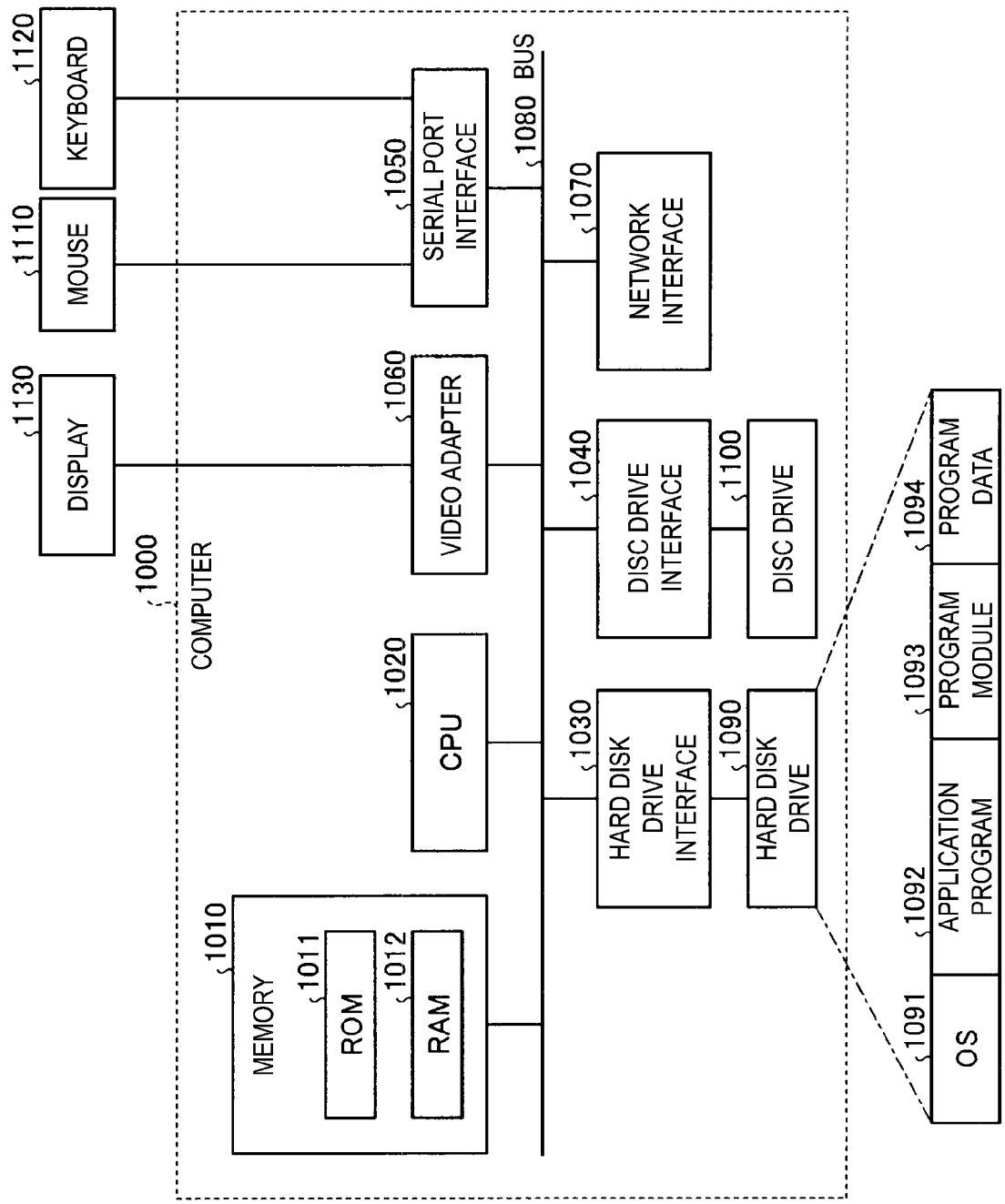
FIG. 12 is a diagram illustrating an example of a computer in which a program is executed to realize a VNF operation apparatus.
Figure 13:
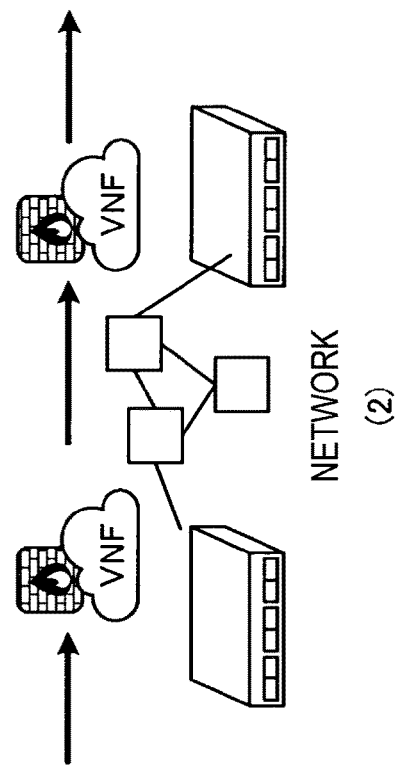
FIG. 13 is a diagram for describing data transfer processing in the related art.
Figure 13:
Figure 13:
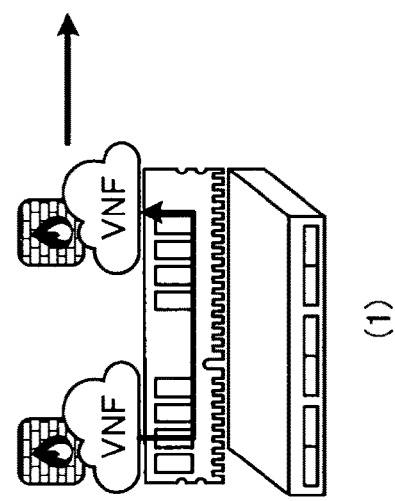
Figure 14:
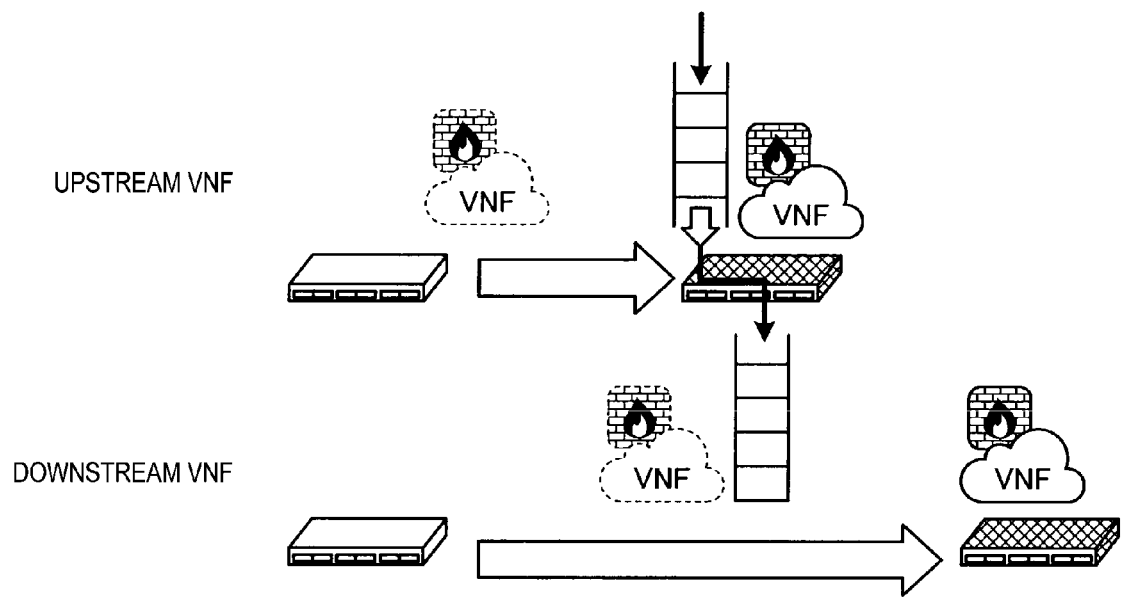
FIG. 14 is a diagram for describing data transfer processing in the related art.

FIG. 12 is a diagram illustrating an example of a computer for realizing the VNF operation apparatuses 10A, 10B by executing a program. The computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program defining each type of processing of the VNF operation apparatuses 10A, 10B is implemented as the program module 1093 in which codes executable by the computer 1000 are described. The program module 1093 is stored in, for example, the hard disk drive 1090. For example, the program module 1093 for executing the same processing as that performed by the functional configuration in the VNF operation apparatuses 10A, 10B is stored in the hard disk drive 1090. Meanwhile, the hard disk drive 1090 may be replaced with a solid state drive (SSD).

Further, configuration data to be used in the processing of the embodiment described above is stored as the program data 1094 in, for example, the memory 1010 or the hard disk drive 1090. The CPU 1020 reads out and executes the program module 1093 or the program data 1094 stored in the memory 1010 and the hard disk drive 1090, as necessary, in the RAM 1012.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in other computers connected via a network (a Local Area Network (LAN), a Wide Area Network (WAN), or the like). In addition, the program module 1093 and the program data 1094 may be read by the CPU 1020 from another computer through the network interface 1070.

Although the embodiment to which the invention made by the present inventor is applied has been described above, the present invention is not limited by the description and the drawings which constitute a part of the disclosure of the present invention according to the present embodiment. That is, other embodiments, examples, operation technologies, and the like made by those skilled in the art based on the present embodiment are all included in the scope of the present invention.

REFERENCE SIGNS LIST

100 Communication system
10A, 10B Virtual network function (VNF) operation apparatus
11 Communication unit
12 Storage unit
13 Control unit
121 Network parameter database (DB)
131 Operation unit 132 Estimation unit
133 Scheduling unit
134 Relocation unit

The invention claimed is:

1. A processing apparatus that relocates data processing functions on another apparatus to continue data processing, the processing apparatus comprising one or more processors configured to perform operations comprising:
    storing information indicating a communication relationship between apparatuses;
    calculating, based on the information indicating the communication relationship, a corresponding estimated transfer delay of data for each of a plurality of schedulings, wherein the transfer delay is generated during relocation of the data processing functions, and each scheduling corresponds to a different order of the apparatuses for performing the relocation of data processing functions;
    selecting a particular scheduling, from the plurality of schedulings, whose corresponding estimated transfer delay is minimized;
    setting, based on the selected particular scheduling, an order of the apparatuses for the relocation of the data processing functions and a start timing of the relocation of the data processing functions; and
    relocating the data processing functions to the other apparatus in accordance with the order and the start timing.

2. The processing apparatus according to claim 1, wherein the operations comprise: storing, as the information indicating a communication relationship between apparatuses, order information indicating a passing order of the data processing functions through which a traffic flow passes.

3. The processing apparatus according to claim 1, wherein the operations comprise: calculating the estimated transfer delay of data generated during the relocation based on a data transfer delay between the data processing functions and a relocation time of the data processing functions.

4. The processing apparatus according to claim 1, wherein the plurality of schedulings include a method of starting relocation from one of the data processing functions close to a receiver side, and a method of simultaneously starting relocation for all the data processing functions.

5. A relocation method for relocating data processing functions to another apparatus to continue data processing, the relocation method comprising:
    calculating, based on information indicating a communication relationship between apparatuses, a corresponding estimated transfer delay of data for each of a plurality of schedulings, wherein the transfer delay is generated during relocation of the data processing functions, and each scheduling corresponds to a different order of apparatuses for performing the relocation of the data processing functions;
    selecting a particular scheduling, from the plurality of schedulings, whose corresponding estimated transfer delay is minimized;
    setting, based on the selected particular scheduling, an order of the apparatuses for the relocation of the data processing functions and a start timing of the relocation of the data processing functions; and
    relocating the data processing functions to the other apparatus in accordance with the set order and start timing.

6. A non-transitory computer readable medium storing one or more instructions causing a computer to execute:
    calculating, based on information indicating a communication relationship between apparatuses, a corresponding estimated transfer delay of data for each of a plurality of schedulings, wherein the transfer delay is generated during relocation of the data processing functions, and each scheduling corresponds to a different order of apparatuses for performing the relocation of the data processing functions;
    selecting a particular scheduling, from the plurality of schedulings, whose corresponding estimated transfer delay is minimized;
    setting, based on the selected particular scheduling, an order of the apparatuses for the relocation of the data processing functions and a start timing of the relocation of the data processing functions; and
    relocating the data processing functions to the other apparatus in accordance with the set order and start timing.

7. The relocation method according to claim 5, comprising:
    storing, as the information indicating a communication relationship between apparatuses, order information indicating a passing order of the data processing functions through which a traffic flow passes.

8. The relocation method according to claim 5, comprising:
    calculating the estimated transfer delay of data generated during the relocation based on a data transfer delay between the data processing functions and a relocation time of the data processing functions.

9. The relocation method according to claim 5, wherein the plurality of schedulings include a method of starting relocation from one of the data processing functions close to a receiver side, and a method of simultaneously starting relocation for all the data processing functions.

10. The non-transitory computer readable medium according to claim 6, wherein the one or more instructions cause the computer to execute:
    storing, as the information indicating a communication relationship between apparatuses, order information indicating a passing order of the data processing functions through which a traffic flow passes.

11. The non-transitory computer readable medium according to claim 6, wherein the one or more instructions cause the computer to execute:
    calculating the estimated transfer delay of data generated during the relocation based on a data transfer delay between the data processing functions and a relocation time of the data processing functions.

12. The non-transitory computer readable medium according to claim 6, wherein the plurality of schedulings include a method of starting relocation from one of the data processing functions close to a receiver side, and a method of simultaneously starting relocation for all the data processing functions.

* * * * *